(12) United States Patent
Chiou et al.

(10) Patent No.: US 8,500,001 B2
(45) Date of Patent: Aug. 6, 2013

(54) BARCODE RECOGNITION METHOD

(75) Inventors: Hann-Huei Chiou, Taipei (TW); Jui-Yu Li, Taoyuan County (TW)

(73) Assignee: Getac Technology Corporation, Hsinchu (TW)

( * ) Notice: Subject to any disclaimer, the term of this patent is extended or adjusted under 35 U.S.C. 154(b) by 448 days.

(21) Appl. No.: 12/889,978

(22) Filed: Sep. 24, 2010

(65) Prior Publication Data
US 2011/0073653 A1 Mar. 31, 2011

(30) Foreign Application Priority Data

Sep. 25, 2009 (CN) .......................... 2009 1 0175757
Aug. 9, 2010 (CN) .......................... 2010 1 0254716

(51) Int. Cl.
*G07G 1/00* (2006.01)
(52) U.S. Cl.
USPC ........................................................... 235/12
(58) Field of Classification Search
USPC ............ 235/462.12, 462.07, 462.08; 382/100
See application file for complete search history.

(56) References Cited

U.S. PATENT DOCUMENTS

| | | | | |
|---|---|---|---|---|
| 4,963,719 A | * | 10/1990 | Brooks et al. | 235/462.12 |
| 5,438,188 A | * | 8/1995 | Surka | 235/462.07 |
| 2008/0069398 A1 | * | 3/2008 | Yamaguchi et al. | 382/100 |

FOREIGN PATENT DOCUMENTS

| EP | 0 754 328 B1 | 1/1995 |
|---|---|---|
| TW | 224525 | 6/1994 |

\* cited by examiner

*Primary Examiner* — Thien M Le
*Assistant Examiner* — Sonji Johnson

(57) ABSTRACT

A barcode recognition method is provided for recognizing a barcode to derive effective barcode information thereof. The barcode includes a plurality of segments. In the method, every time the barcode is scanned and recognized, any segment, in which a barcode information fragment carried therein is able to be derived, is recorded as an effective segment. And then the effective segments are selected and combined to generate a plurality of segment combinations. The information carried by the segment combinations is respectively verified by the checksum thereof, so as to find out the segment combination, which is successfully verified by the checksum thereof, to be the effective combination. Every time the barcode is scanned and recognized, only part of the segments of the barcode has to be successfully recognized, and the effective segments derived are combined and verified, so as to quickly recognize the barcode.

8 Claims, 5 Drawing Sheets

BARCODE RECOGNITION METHOD

CROSS-REFERENCES TO RELATED APPLICATIONS

This non-provisional application claims priority under 35 U.S.C. §119(a) on Patent Applications No. 200910175757.3 filed in China on Sep. 25, 2009, and No. 201010254716.6 field in China on Aug. 9, 2010, the entire contents of which are hereby incorporated by reference.

BACKGROUND OF THE INVENTION

1. Field of the Invention

The present invention relates to a barcode recognition method, and more particularly to a barcode recognition method for linear or stacked barcode.

2. Related Art

A linear barcode contains black and white bar blocks arranged at intervals. On the basis of an assigned barcode protocol, a width of each bar block and an arrangement of black and white combination of bar blocks represent different numbers and letters. The number and letter combination represented by the aforementioned width and black and white combination of bar blocks are different according to the barcode protocols.

Currently, there are two common methods for recognizing the barcode. In the first method, entire image containing the barcode is captured, and complex numerical operation is performed on the captured image through complex image processing method to find out an area containing the barcode in the captured image. However, the method of processing the entire image consumes much hardware resources. To a handheld data processing device with relatively low hardware performance, this method requires considerable operation time.

The second method is mainly directed to a linear barcode. A scan track is defined in the captured image through all the bar blocks of the barcode, the image is processed and binarization process is performed only on the scan track, and the barcode is decoded after a binary array is generated. In this method, only one scan track is processed, therefore the barcode recognition rate is very fast. However, one single scan track may contain a portion that cannot be binarized due to poor sampling quality, so the recognition result of the barcode cannot pass the checksum verification. Particularly for a long barcode, for example, a barcode containing multiple segments, there is an increased probability that the recognition result cannot pass the checksum verification due to recognition errors of a single barcode data character. As long as a recognition error occurs with regard to any barcode data character or a certain bar cannot be imaged clearly, the recognition result cannot pass the checksum verification, so this recognition result is directly abandoned and next scanning and recognizing procedure has to be performed. If the barcode has an undesirable quality, the scanning and recognizing procedure are repeated additional times, requiring considerable additional scanning and recognition time.

SUMMARY OF THE INVENTION

In the prior art, when performing barcode recognition along a scan track defined in the barcode, it is usually necessary to scan and recognize the barcode for many times for deriving a recognition result that is able to pass the checksum verification.

In view of the above problems, the present invention is directed to a barcode recognition method, that reduces the number of times required for performing scanning and recognizing procedure on the barcode.

The present invention provides a barcode recognition method, applicable to a barcode recognition system, for scanning and recognizing a barcode to derive effective barcode information thereof. The barcode includes a plurality of segments, and the barcode also includes at least one checksum.

In the method of the present invention, a barcode capturing module is utilized for capturing the barcode at first; and then the method is to repeatedly and respectively scan and recognize the barcode along a plurality of scan tracks, in which each of the scan tracks passes through the segments of the barcode.

After scanning and recognizing the barcode along any one of the scan tracks, the method is to perform the following steps:

Analyzing a barcode information fragment carried by each of the segments of the barcode to determine effective segments among the segments, wherein an effective segment is one of the segments in which a barcode information fragment carried is able to be recognized and derived;

Recording the effective segments and the corresponding barcode information fragments in a data storage device, and generating a plurality of segment combinations according to the effective segments, wherein each of the segment combination includes the effective segments consisting the barcode;

Verifying each of the segment combinations with the checksum of each of the segment combinations, and then finding out the segment combination being successfully verified with the checksum thereof as the effective combination; and Outputting the effective barcode information of the effective combination.

The advantage of the present invention lies in that it is not necessary to successfully recognize the whole barcode in one single barcode recognition process. Through performing the method of the present invention, every time the barcode is scanned and recognized by the barcode recognition system, only part of the segments of the barcode has to be successfully recognized. Then, the barcode recognition system combines the effective segments derived every time, and then the procedures to recognize the barcode and derive the barcode information are finished. Therefore, through the method of the present invention, the number of times required for scanning and recognizing the barcode is reduced and the barcode recognition efficiency is enhanced.

BRIEF DESCRIPTION OF THE DRAWINGS

The present invention will become more fully understood from the detailed description given herein below for illustration only, and thus not limitative of the present invention, wherein.

DETAILED DESCRIPTION OF THE INVENTION

Figure 1:
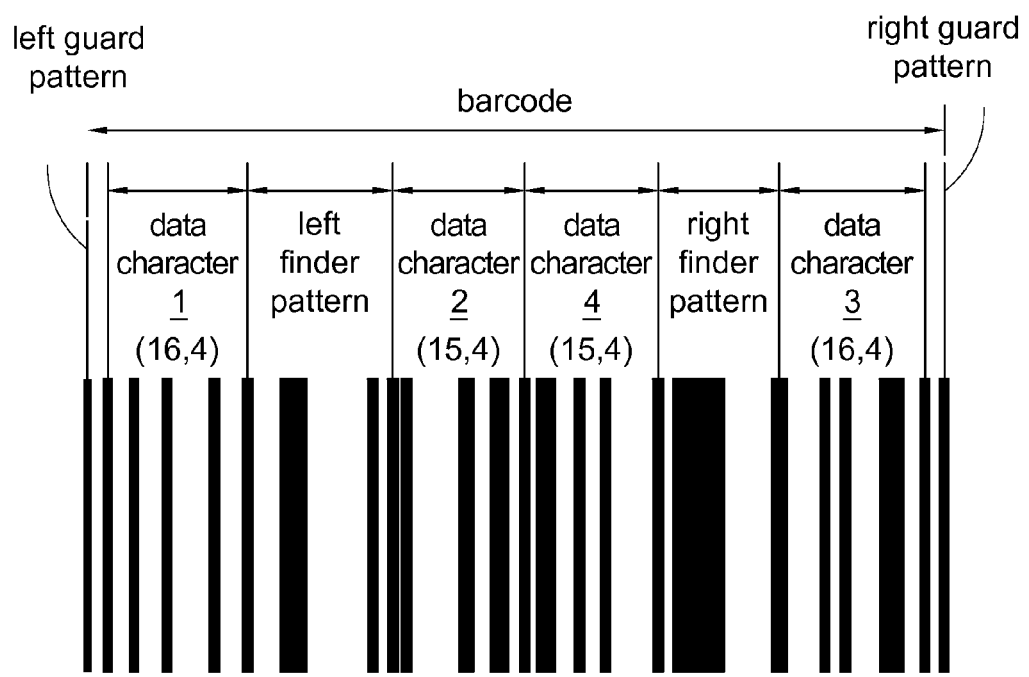
FIG. 1 is a schematic diagram of a barcode including two segments for illustrating the barcode recognition method of the present invention.

Referring to FIG. 1, a linear barcode is shown, which is a RSS-14 barcode, also as known as a GS-1 Databar barcode. The embodiment of the present invention takes RSS-14/GS-1 Databar as an illustration, but the method of the present invention is not limited to be performed on RSS-14/GS-1 Databar.

Generally, a barcode includes a left guard pattern, a right guard pattern, a finder pattern, and a data character. The left guard pattern and the right guard pattern delimit the range of the barcode, that is, the barcode is located between the left guard pattern and the right guard pattern. The finder pattern delimits the position of the barcode, so as to serve as a reference to analyze the widths and the combination manner of the black and white bar blocks.

In a relatively long barcode, a barcode is divided into a plurality of segments, and each of the segments is given a finder pattern. Take an RSS-14 barcode as an example, the barcode is divided into a left segment and a right segment. The left segment includes a left finder pattern, while the right segment includes a right finder pattern. According to the other barcode protocol, a barcode may include one single segment and one single finder pattern, or a barcode may include more than two segments and more than two finder patterns. In the aforementioned RSS-14 barcode, each of the left and right segments includes two data characters located beside the left/right segment. There is at least one checksum among the data characters, and the checksum is provided for verifying the barcode information.

Figure 2:
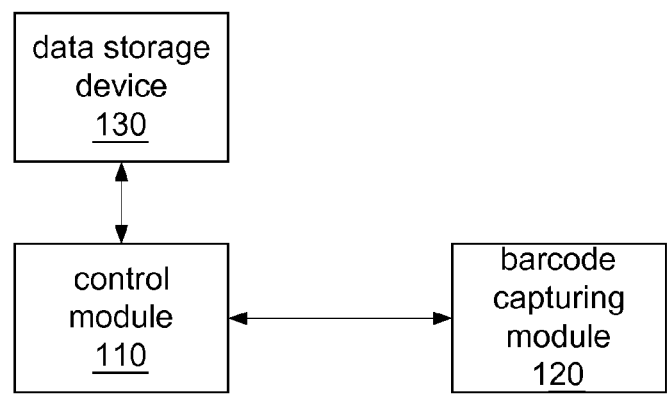
FIG. 2 is a barcode recognition system performing the barcode recognition method of the present invention.

Referring to FIG. 2, the barcode recognition method of the present invention is applicable to a barcode recognition system, for scanning and recognizing a barcode including a plurality of segments to derive effective barcode information of the barcode. As described above, the barcode also includes a checksum.

As shown in FIG. 2, the barcode recognition system at least includes a control module 110, and barcode capturing module 120, and a data storage device 130. The barcode recognition system may be a handheld data processing apparatus, for example, a personal digital assistant (PDA). The control module 110 includes the CPU and system logic chipset of the handheld data processing apparatus. The CPU and the system logic chipset can be separated components disposed on a circuit board, or the CPU and the system logic chipset can be integrated into a System-On-Chip (SOC). The barcode capturing module 120 is the cam of the handheld data processing apparatus. The cam is preferable a cam having resolution capability more than one mega pixels. The data storage device 130 is memory device of the handheld data processing apparatus, including program memory and storage memory. Alternatively, the handheld data processing apparatus can be a desktop computer, a laptop computer, an industrial computer, or a thin client computer, in which the control module 110 includes a CPU and a system logic chipset of the computer; the barcode is a digital cam or a handheld scanner connected to the computer; and the data storage includes fixed storage medium device and system memory modules.

Figure 3:
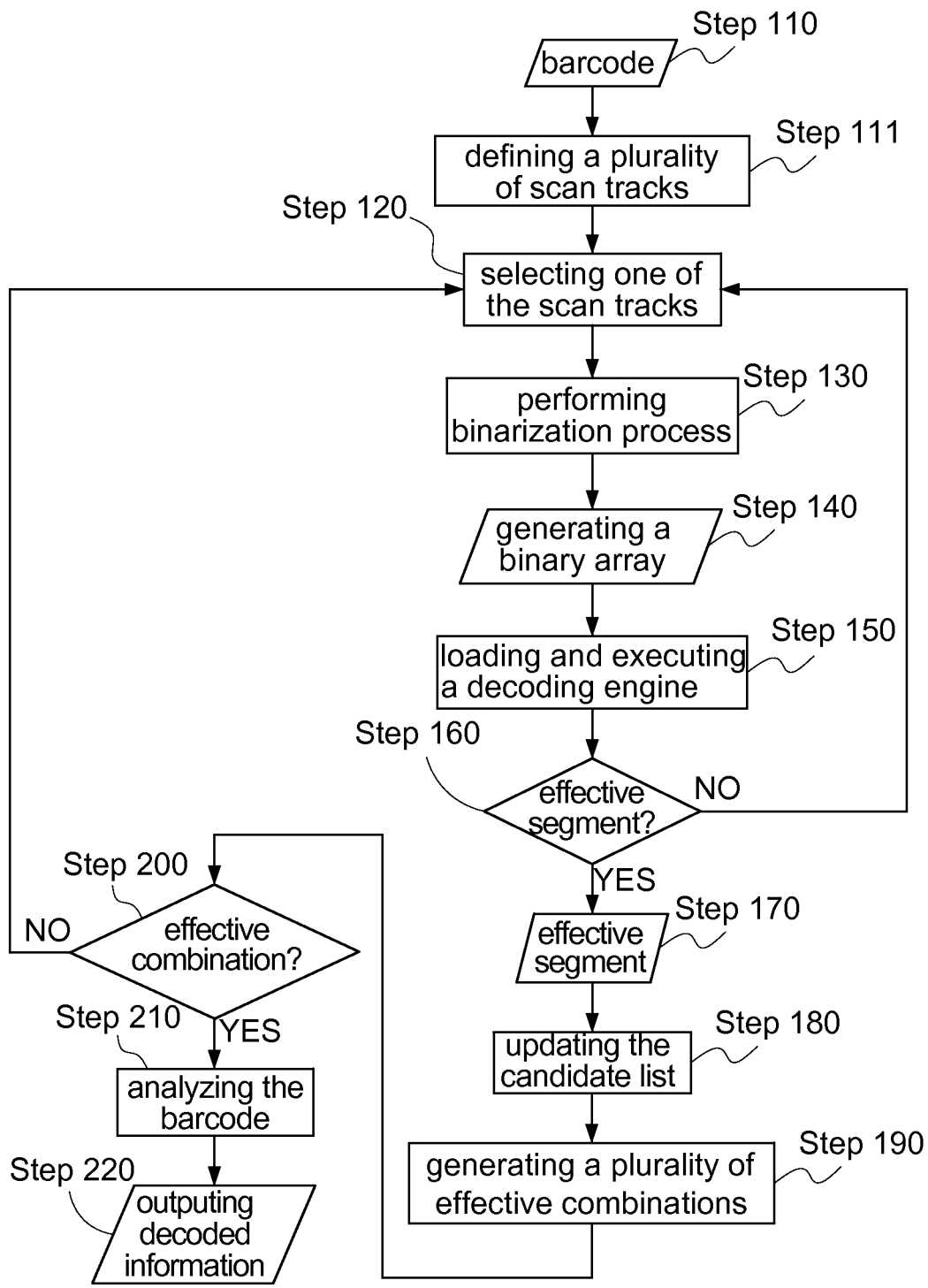
FIG. 3 is a flowchart of the barcode recognition method of the present invention.

Referring to FIG. 3, a flowchart of the barcode recognition method of the present invention is shown, the details of the barcode recognition method are described as below.

Figure 4:
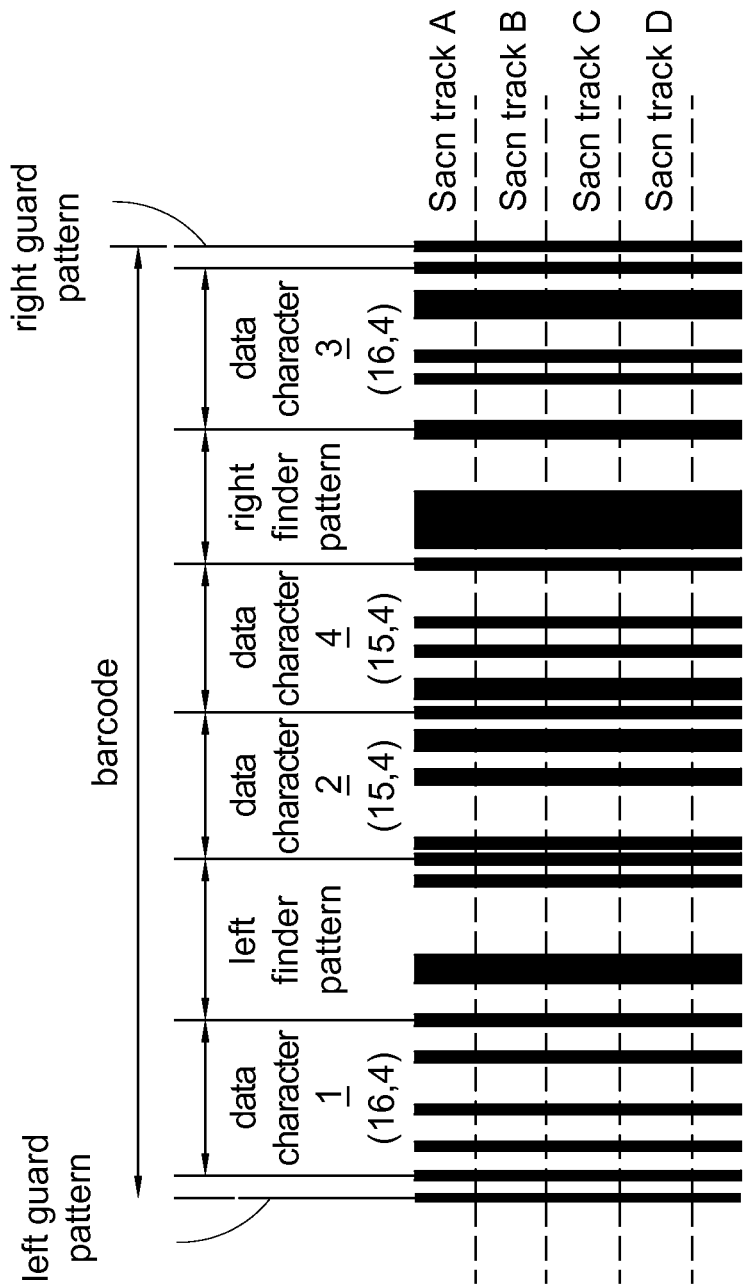
FIG. 4 shows a barcode with a plurality of scan tracks defined thereon.

As shown in FIG. 4, the control module 110 enables the barcode capturing module 120 at first, so as to control the barcode capturing module 120 to capture the barcode, as in Step 110.

At the same time, the control module 110 caches the captured barcode in a data storage device 130.

Then, the control module 110 defines a plurality of scan tracks (A, B, C, and D) in the captured barcode, as shown in Step 111. Each of the scan tracks (A, B, C, and D) passes through all of the segments of the barcode, specifically; each of the scan tracks (A, B, C, and D) passes through the solid (black) block bars consisting of the barcode. And these scan track (A, B, C, and D) are parallel to each other.

Next, the control module repeatedly and respectively scans and recognizes the segments of the barcode along each of the scan tracks (A, B, C, and D).

Performing the procedure of scanning and recognizing along the each of the scan tracks (A, B, C, and D) is that the control module 110 selects one of the scan tracks (A, B, C, and D) along which the procedure of scanning and recognizing the barcode is not performed yet, to scan and recognize the barcode again, as in Step 120. For example, on the beginning of the barcode recognition procedure, the control module 110 selects the scan track A, which is located at a highest position, among the scan tracks (A, B, C, and D) to be the selected scan track.

The control module 110 performs binarization process on the selected scan track A, as in Step 130.

Figure 5:
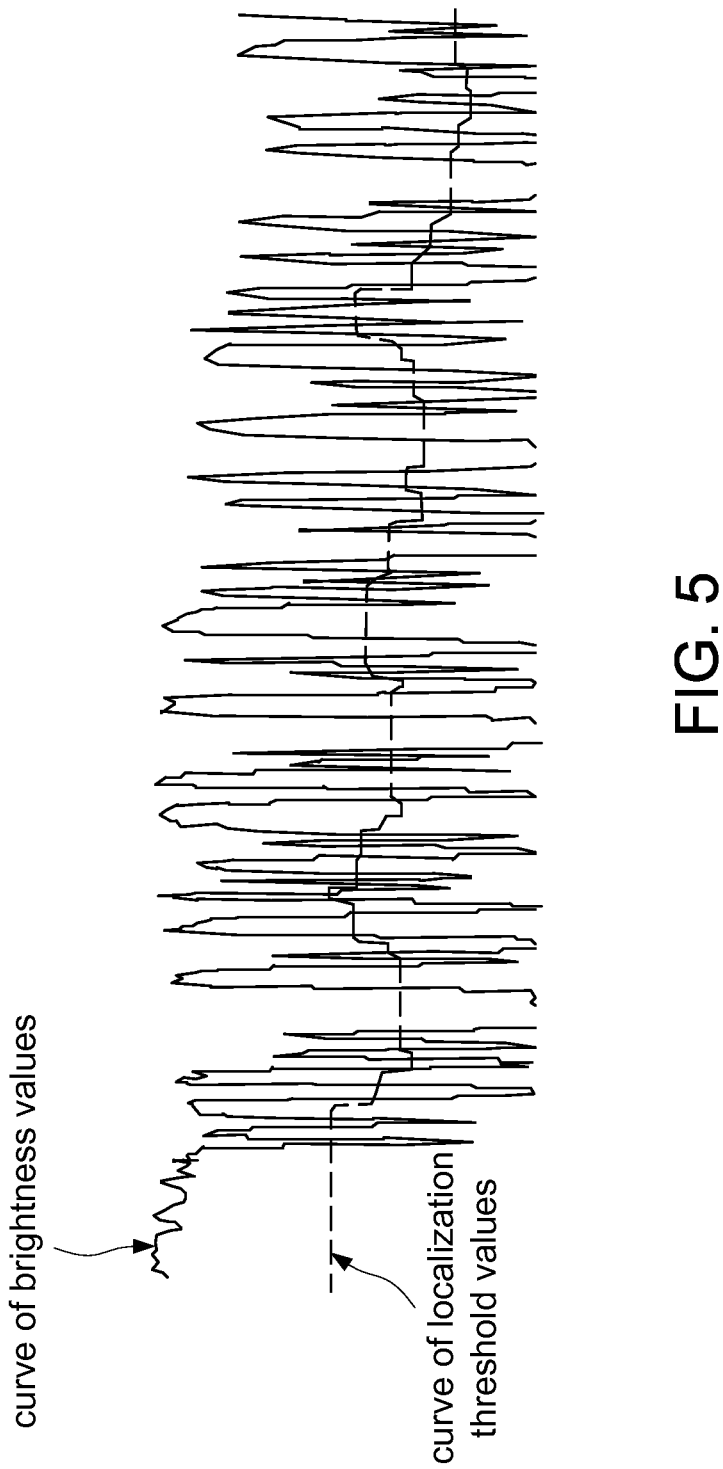
FIG. 5 is a curve of brightness values and a curve of localization threshold values of the barcode.

Please refer to FIG. 5. The control module 110 sets a plurality of sampling points on a curve of brightness values in Step 130. The control module 110 defines a localization section on the curve of brightness values corresponding to each of the sampling points and containing the sampling point. Then, the control module 110 finds out a peak having a minimum brightness value and a valley having a maximum brightness value within the localization section.

Next, the control module 110 accumulates the peak having a minimum brightness value and the valley having a maximum brightness value, and the divides the sum by 2 to obtain a mean value of the peak having a minimum brightness value and the valley having a maximum brightness value. The mean value serves as the localization threshold value. On the basis of each of the localization threshold value, the control module 110 determines the binarization result of each of the sampling point, so as to obtain optimized binarization results. The localization section is a section defined by a point falling beyond and a point falling behind the sampling point, and comprises a plurality of valleys and a plurality of peaks. For example, a section containing the sampling point, 4 peaks, and 4 valleys is defined to be the localization section; and the control module 110 finds out a peak having a minimum brightness value among 4 peaks and a valley having a maximum brightness value among 4 valleys, so as to obtain the mean value as the localization threshold value. The purpose to obtain the localization threshold value is that the binarization threshold value of each sampling point is changed with the changes of adjacent sampling points. Therefore, negative effect of non-uniformly distribution of brightness in the barcode is eliminated, so as to prevent large distortion occur to binarization result of the barcode.

Please refer to FIG. 3 and FIG. 4, the control defines the selected scan track A as a coordinate axis and generates the curve of brightness values. And then the control module 110 generates a binary array according to the variation of the brightness values, as in Step 140.

Next, the control module 110 loads and executes a decoding engine for analyzing the binarization result, as in Step 150.

Then, the control module 110 performs the following steps after scanning and recognizing the barcode along any one of the scan tracks (A, B, C, and D).

By executing the decoding engine, the control module 110 analyzes a barcode information fragment carried by each of the segments, so as to determine whether at least one effective segment exists among the segments, as in Step 160. The aforementioned effective segment is one of the segments in which a barcode information fragment carried is able to be recognized and derived.

The procedure to find out the effective segment is that the control module 110 searches a finder pattern of the barcode to delimit the segment corresponding to the finder pattern, and then scans and recognizes the barcode to derive a barcode information fragment carried by each of the segments.

Take the RSS-14 barcode in FIG. 5 as an example of a barcode including plural segments. The barcode at least includes two finder patterns (left/right finder pattern), corresponding to two segments (left/right segments). On the basis of the two finder patterns (left/right finder pattern), the control module 110 divides the barcode into two segments. Occasionally, maybe only one of the two finder patterns is found by the control module 110 for analyzing the corresponding segment. Therefore, the effective segment obtained on scan track A may be only one segment of the plural segments.

If in Step 160, if no effective segment is found by the control module 110, the control module 110 returns to Step 120 to select a scan track along which the procedure of scanning and recognizing the barcode is not performed yet, to be another selected scan track, and search the effective segment again. For example, when no effective segment is found on scan track, the control module 110 returns to Step 120, selects one of the three scan tracks B, C, D, and then search effective segment again.

If at least one effective segment is found in Step 160, the control module 110 outputs the effective segment and the corresponding barcode information fragment to the data storage device 130, so as to record the effective segment and the corresponding barcode information fragment, as in Step 170.

Usually, the effective segment and the corresponding barcode information fragment are recorded in a candidate list in the data storage device 130. At this time, the control module 110 updates the candidate list stored in the data storage device 130, as in Step 180. After repeatedly and respectively scanning and recognizing theses scan tracks (A, B, C, and D), the candidate list will record a plurality of effective segments and the corresponding barcode information fragments.

Figure 6:
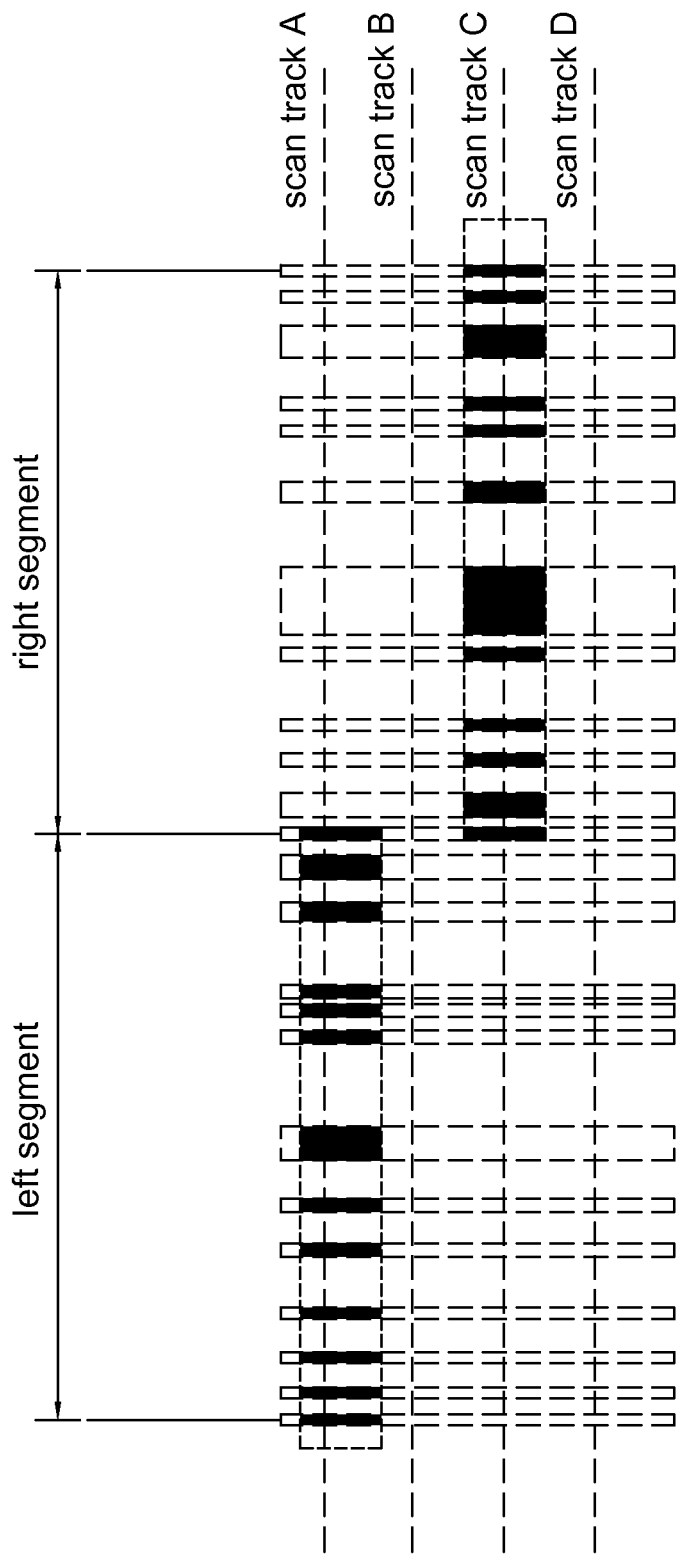
FIG. 6 is a schematic diagram showing the barcode, the scan track and the effective segments.

Please refer to FIG. 6. the RSS-14 barcode is taken as an illustration.

When scanning and recognizing the barcode along scan track A, the control module 110 may only derives the barcode information fragment of the left segment, therefore, the control module 110 only records the left segment as an effective segment L1 and the corresponding barcode information fragment in the candidate list without recording that of the right segment.

When scanning and recognizing the barcode along scan track B, the control module 110 may derive nothing due to distortion of barcode image.

When scanning and recognizing the barcode along scan track C, the control module might only derive the barcode information fragment of the right segment, therefore, the control module 110 only records the right segment as an effective segment R1 and the corresponding barcode information fragment in the candidate list without recording that of the left segment.

Occasionally, the control module 110 derives barcode information fragments of the left segment and the right segment along one of the scan tracks (A, B, C, and D) at the same time; however, the combination of the barcode information fragments of the left segment and the right segment does not satisfy the RSS-14 barcode protocol, and the combination of the barcode information fragments can not serve as the final recognition result. Occasionally, one of the two barcode information fragments is correct, therefore, the barcode information fragments of the left segment and the right segment are still recorded in the candidate list. Occasionally, after scanning and recognizing along scan tracks A, B, C, the barcode recognition result is derived; the control module 110 will not scan and recognize the barcode along the scan track D.

Next, the control module 110 selects effective segments recorded in the candidate list and generates a plurality of segment combinations by combining the selected effective segments. And each of the segment combination includes segments consisting of the barcode illustrating by RSS-14 barcode in FIG. 6, the control module 110 randomly selected an effective segment of the left segment (for example, L1) and an effective segment of the right segment (for example, R1) from the candidate list, and then generates an segment combination.

The control module 110 verifies the barcode information carried by each of the segment combination with a checksum thereof, so as to find out a segment combination being successfully verified with the checksum thereof as an effective combination, as in Steps 190 and 200.

For example, the control module 110 combines the left effective segment L1 with the right effective segment as a segment combination, and then verifies the barcode information of the segment combination with checksum.

The segment combination successfully verified with the checksum thereof is an effective combination. And the control module 110 determines whether the candidate list can use to generate an effective combination through checksum verification, as in Step 200. That is, through the method of the present invention, the segments of the effective combination of the barcode are derived from different scan track (A, B, C, and D). It is not necessary to finish barcode recognition procedure in one single scan track.

If in Step 200 the control module 110 can not find out an effective combination, the control module 110 returns to Step 120 to select a scan track (A, B, C, and D) along which the procedure of the scanning and recognizing the barcode is not performed yet, to be another selected scan track, and search the effective segment again.

If the control module 110 finds out the effective combination, the control module 110 further analyzes the barcode. The effective barcode information is a combination of numbers and letters, such that the effective barcode information analyzed to be decoded into the original carried information, as in Step 210. After the barcode has been analyzed, the control module 110 outputs the decoded information, as in Step 220.

According to the barcode recognition method of the present invention, the barcode including segments is divided in Step 160 to Step 200, and the successfully recognized segment is recorded every time the barcode recognition is performed. The segments that are not successfully recognized again will be recognized again when barcode recognition is performed along the other scan track. Through verifying the segment combinations with the check thereof, the segment combination will be found to be the barcode recognition result. By performing the barcode recognition method of the present invention, it is not necessary to successfully recognize the barcode in a single barcode recognition procedure, therefore, the times requires to perform barcode recognition procedure is reduced and the recognition efficiency is enhanced.

Additional advantages and modifications will readily occur to those proficient in the relevant fields. The invention in its broader aspects is therefore not limited to the specific details and representative embodiments shown and described herein. Accordingly, various modifications may be made without departing from the spirit or scope of the general inventive concept as defined by the appended claims and their equivalents.

What is claimed is:

1. A barcode recognition method, for recognizing a barcode to derive effective barcode information of the barcode, wherein the barcode includes a plurality of segments and at least one checksum, wherein each of the plurality of segments is delimited by a corresponding finder pattern, and at least one of the plurality of segments comprises at least two characters, the barcode recognition method comprising the following steps:

capturing the barcode;
   repeatedly and respectively scanning and recognizing the barcode along a plurality of scan tracks, in which each of the scan tracks passes through the segments of the barcode;
   after scanning and recognizing the barcode along any one of the scan tracks, performing the following steps:
   analyzing a barcode information fragment carried by each of the segments of the barcode, and determining whether at least one effective segment exists among the segments, wherein an effective segment is one of the segments in which the barcode information fragment carried is able to be recognized and derived;
   recording the effective segments and the corresponding barcode information fragments;
   according to the effective segments, randomly combining effective segments to generate a plurality of segment combinations, wherein each of the segment combinations includes a combination of effective segments consisting the barcode; and
   verifying each of the segment combinations with the checksum of each of the segment combinations, and then finding out the segment combination being successfully verified with the checksum thereof as a effective combination; and
   outputting the effective barcode information of the effective combination.

2. The barcode recognition method as claimed in claim 1, wherein after verifying each of the segment combinations with to the checksum thereof, scanning and recognizing the barcode again along another scan track if none of the segment combination is successfully verified with the checksums.

3. The barcode recognition method as claimed in claim 1, wherein the steps of capturing the barcode comprises:
   controlling a barcode capturing module to capture the barcode, and caching the barcode in a data storage device.

4. The barcode recognition method as claimed in claim 1, wherein the steps of repeatedly and respectively scanning and recognizing the barcode along the plurality of scan tracks comprises:
   defining the scan tracks on the barcode by a control module; and
   selecting one of the scan tracks, and scanning and recognizing the barcode to derive the effective barcode information of the barcode by the control module.

5. The barcode recognition method as claimed in claim 1, wherein the steps of finding out each of the effective segments comprises:
   searching for each finder pattern of the barcode and delimiting the plurality of segments according to the finder patterns; and
   scanning and recognizing the barcode to derive the barcode information fragment carried by each of the segments.

6. The barcode recognition method as claimed in claim 1, wherein the steps of scanning and recognizing the barcode information fragment carried by each of the segments comprises:
   selecting another one of the scan tracks, along which the procedure of scanning and recognizing the barcode is not performed yet, to scan and recognize the barcode again, if no effective segment is derived along the current scan track.

7. The barcode recognition method as claimed in claim 1, further comprising:
   performing a binarization process along the selected scan track to recognizing the barcode; and the binarization process comprising the following steps:
   defining the selected scan track as a coordinate axis, and generating a curve of brightness values;
   setting a plurality of sampling points on the curve of brightness values;
   defining a localization section on the curve of brightness values corresponding each of the sampling points and containing the sampling points;
   finding out a peak having a minimum brightness value among peaks and a valley having a maximum brightness value among valleys within the localization section;
   determining a mean value of the peak having the minimum brightness value and the valley having the maximum brightness value as the localization threshold value of each of the sampling points; and
   on the basis of each of the localization threshold value, determining a binarization result of each of the sampling points.

8. The barcode recognition method as claimed in claim 7, wherein the localization section is a section defined by a point falling beyond and a point falling behind the sampling point, and comprises a plurality of valley and a plurality of peaks.

* * * * *